Dec. 18, 1923.
R. O. FRASER
1,478,113
DEVICE FOR MAKING SANDWICHES
Filed Feb. 13, 1922
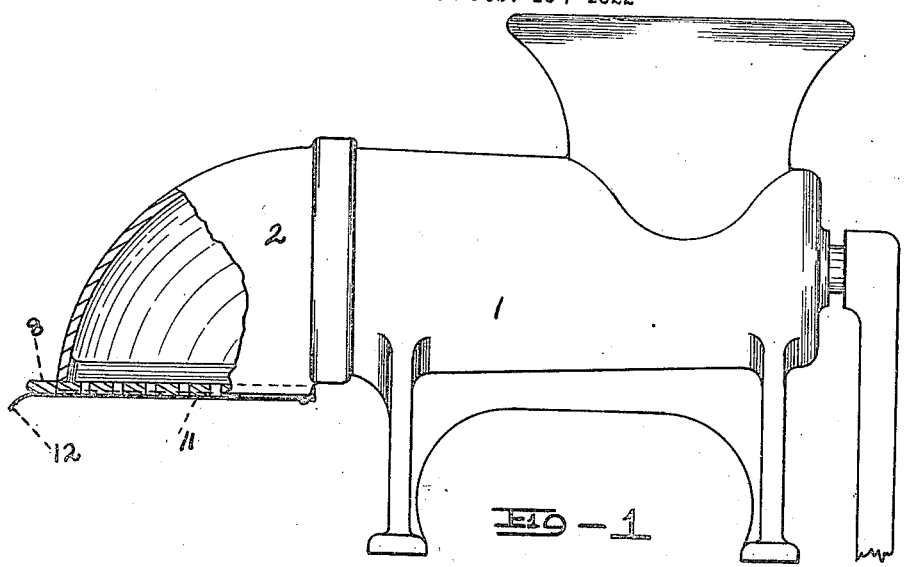
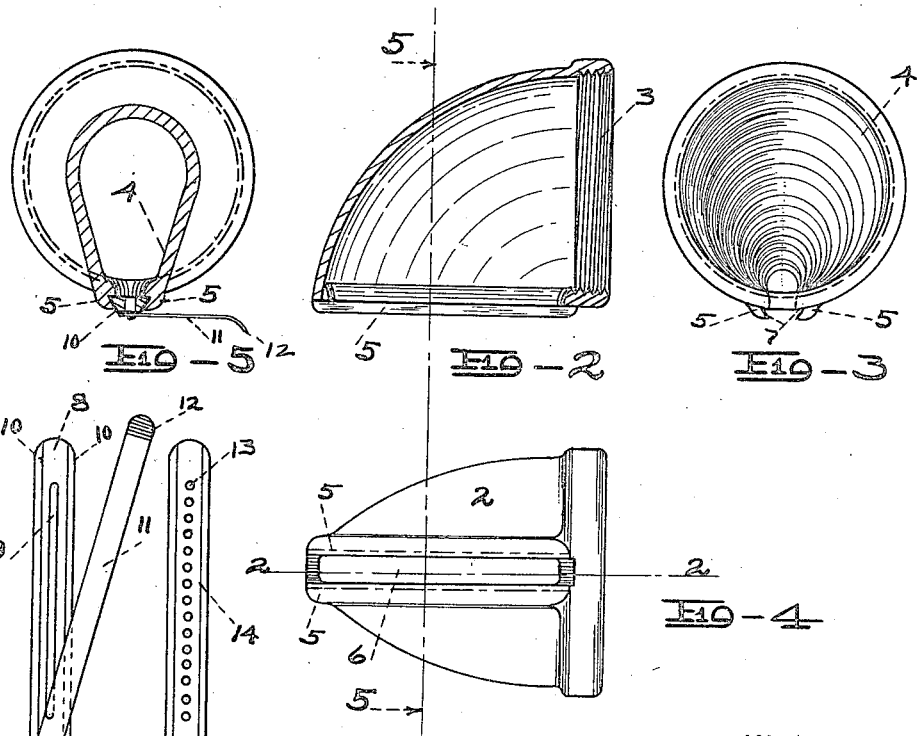
INVENTOR
ROBERT O. FRASER
BY
J. L. Rivers.
ATTORNEY Patented Dec. 18, 1923.

1,478,113

UNITED STATES PATENT OFFICE.

ROBERT O. FRASER, OF SEATTLE, WASHINGTON.

DEVICE FOR MAKING SANDWICHES.

Application filed February 13, 1922. Serial No. 536,398.

*To all whom it may concern:*

Be it known that I, ROBERT O. FRASER, a citizen of the United States, residing at Seattle, in the county of King and State of Washington, have invented a new and useful Device for Making Sandwiches, of which the following is a specification.

My invention, relating as it does to improvements in devices of the class mentioned, has for its objects the provision of a spout of special construction, attachable to an ordinary meat grinder, or any machine having means for expelling foods in plastic condition, whereby a thin layer of said food will be spread upon a piece of bread held adjacent the spout, and a cutter provided to detach the requisite quantity for a sandwich. Further, additional means are included for distributing said food upon the bread in shredded form, as the consistency of some foods or the quantity to be spread make this feature desirable.

In the accompanying drawings—

Figure 1 is a side elevation of a meat grinder equipped with said spout, a portion of the spout being broken away to better illustrate its interior.

Fig. 2, a longitudinal section of spout drawn on the line 2—2 of Fig. 4, through the throat of same, with throat strip removed.

Fig. 3, an end elevation of spout where it is attachable to the discharge opening of grinder.

Fig. 4, a bottom view of spout, showing throat with throat strip removed.

Fig. 5, a cross section drawn on line 5—5 of Figs 2 and 4, illustrating the forward portion of spout as reduced in size, and including throat strip and cutter.

Fig. 6, an elevation of a slotted throat strip and a cutter pivoted thereto, the cutter being partly moved to one side to show its relation with the strip, the same adapted to be detachably mounted in the throat.

Fig. 7, an elevation of a perforated throat strip, adapted to be similarly mounted in the throat, the cutter being removed.

Referring more particularly to the drawings, 1 denotes a meat grinder, 2 the body of said spout and 3 interior screw threads in the spout for attaching the same to the discharge opening of the grinder. For the purpose of illustrating the present embodiment of the invention, a meat grinder is shown with the spout threaded thereto, however, any machine for expelling food in plastic form may be utilized, and the spout may be attached to its discharge opening in any suitable manner.

Fig. 3 shows the interior of the body of the spout where it is attachable to the grinder, being circular in form; 4, in Figs. 3 and 5, designating how it is gradually reduced in size towards the forward end to make a body of symmetrical form as indicated in Fig. 4. The body terminates at its lower portion in a throat 5, having a longitudinal slot 6. This slot is open at either end, and its sides are inwardly beveled as denoted by 7, in Fig. 3.

The throat strip 8 is provided with a longitudinal slot 9, either side of the strip being beveled as indicated by 10. It carries a cutter 11, pivoted at its lower surface, comprising preferably a thin strip of spring material adapted to snugly fit the lower portion of the strip and to cover the slot in the strip. It terminates at one end in a handle 12, which projects beyond the forward end of the strip. The strip, having beveled sides complementary to the sides of the throat, is slidably mounted therein, making a dovetailed joint as shown in Fig. 5. The portion to which the cutter is pivoted represents its rear end, and its forward end, when in operative position, projects slightly beyond the spout, to facilitate the placing or removal of the throat strip therein, as indicated in Fig. 1.

The perforated throat strip 13, Fig. 7, is of the same construction as the strip 8, with the exception that it is provided with a series of perforations 14, in lieu of a slot, and it is adapted to be used interchangeably with the slotted strip in the spout.

In utilizing this invention, for instance, with the slotted throat strip 8 placed in the throat 5 and extending over the slot 6 and made operative by the cutter 11 being moved out of the way, a slice of bread is held in a horizontal position with one edge adjacent the slot in said strip; food in plastic condition is forced through the grinder and through said spout and the longitudinal slot in the strip, when a thin layer of the food can be spread on the bread. This is effected, as is evident, by the turning of the crank of the grinder, and the bread being moved by the hand to take the layer as deposited. When a sufficient amount has been thus spread on the bread, the layer is cut from the spout by moving the cutter 11 over the slot in the strip. When the device is not in use, this cutter also serves as a closure for the slot, keeping the contents of the spout in sanitary condition.

In working with some foods, I find that the perforated throat strip is preferable. Particularly so, in handling peanut butter, which often is of a heavy consistency. The perforations can be made of any suitable size, to meet the requirements of different foods, and so spaced apart as to graduate the amount to be distributed. The use of this strip obviously will shred the food, and enable it to be spread in such form.

This invention contemplates the use of various foods in plastic condition, such as sardines, peanut butter, cheese, and meats of all kinds, and it affords a sanitary, convenient way for spreading edible material in plastic form in the making of sandwiches.

Changes in and modifications of the construction described may be made without departing from the spirit of my invention or sacrificing its advantages, hence I ask that I be not confined to the specific structure set forth.

I claim:

1. A spout, comprising a hollow body having a receiving end adapted to communicate with the discharge opening of a machine for expelling foods in plastic condition, its lower portion terminating in a slotted throat of substantial length, a throat strip detachably mounted therein adapted to distribute thin portions of said food therethrough, a cutter for the food in pivotal engagement with said strip, and means for attaching the receiving end to said discharge opening.

2. A spout, comprising a hollow body having an opening at one end adapted to be attached to the discharge opening of a machine for expelling foods in plastic condition, its lower portion terminating in a slotted throat of substantial length, and a throat strip detachably mounted therein adapted to distribute thin portions of said food therethrough.

3. In a device of the class described, a throat strip comprising a piece of stock having a longitudinally extending discharge opening adapted to distribute thin portions of food in plastic condition, and a cutter pivoted thereto carrying at one end a handle extending beyond the strip.

ROBERT O. FRASER.